No. 775,803. PATENTED NOV. 22, 1904.
W. T. DUNBAR.
HORSE DETACHER.
APPLICATION FILED MAR. 28, 1904.
NO MODEL.
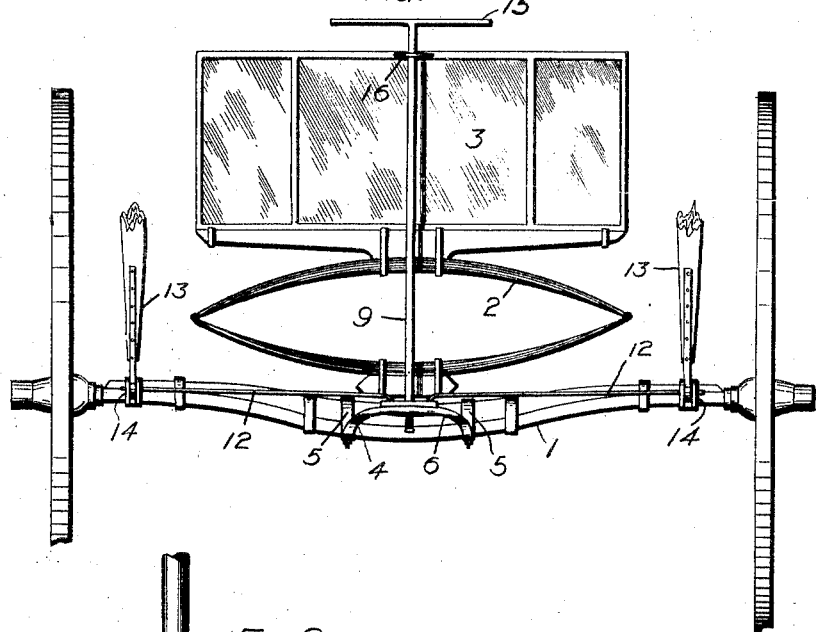
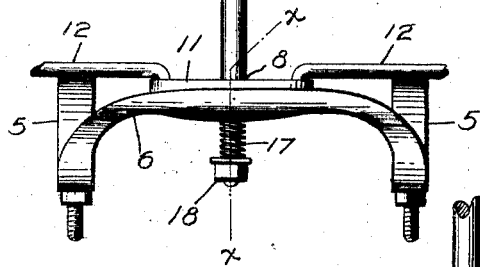
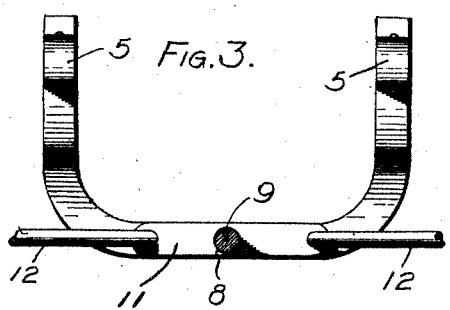
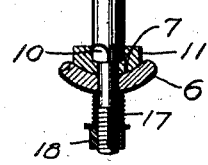
Witnesses: Roy C. Claflin, C. E. Schnell
Inventor: William Thomas Dunbar, by Edson Bros, Attorneys.

No. 775,803. Patented November 22, 1904.

UNITED STATES PATENT OFFICE.

WILLIAM THOMAS DUNBAR, OF ELLIS MILLS, TENNESSEE.

HORSE-DETACHER.

SPECIFICATION forming part of Letters Patent No. 775,803, dated November 22, 1904.

Application filed March 28, 1904. Serial No. 200,409. (No model.)

*To all whom it may concern:*

Be it known that I, WILLIAM THOMAS DUNBAR, a citizen of the United States, residing at Ellis Mills, in the county of Houston and State of Tennessee, have invented certain new and useful Improvements in Horse-Detachers; and I do hereby declare the following to be a full, clear, and exact description of the invention, such as will enable others skilled in the art to which it appertains to make and use the same.

My invention relates to improvements in horse-detachers, particularly to that class in which rods or bolts are secured to opposite ends of a double-armed lever having a suitable operating-handle and the extremities of said rods forming the securing-pins holding the shafts in their sockets.

Heretofore in this class of devices coiled springs have been used at each end of these rods to hold them in engagement with said shafts. These springs are exposed to the weather and are liable to become broken and lost, thus allowing the shafts to become inadvertently detached.

The object of my invention is to prevent accidental displacement of the shaft-retaining rods, and to this end I provide the bracket or support for the double-armed lever with a grooved surface into which a correspondingly-rounded surface of the lever rests when the rods are extended to retain the shafts, there being suitable means provided for holding said lever in that position against premature movement, but allowing it to be readily adjusted to detach the shaft and horse when necessary.

In the accompanying drawings, illustrating the preferred embodiment of my invention, Figure 1 is a front elevation of my device attached to the front axle of a vehicle, the dashboard and portions of the wheels being shown and the rods extended. Figs. 2 and 3 are enlarged front and plan views of the device, the handle, rods, and axle being broken away; and Fig. 4 is a cross-sectional view taken on line *x x* of Fig. 2.

Referring more particularly to the drawings, 1 is the front axle of a vehicle, 2 the front spring, and 3 the dashboard. A bracket 4 is secured to the axle by means of adjustable loops 5, arranged, preferably, one on each side of its center. Said bracket is preferably formed of a single piece of metal 6, having its extremities bent parallel with each other and provided with perforations for the passage of the ends of said loops, which are preferably screw-threaded to be adjusted by nuts placed below said metal piece 6. From its end said piece 6 preferably curves upward toward its center, where it runs at right angles to its extremities. Said forward portion is provided with a groove 7 in its upper surface and a central perforation 8, through which passes the standard 9, terminating at its upper end in a suitable handle and having near its lower extremity, just above said forward portion of the bracket 4, a square surface 10, on which is fitted the double-armed lever 11. This lever has its lower face rounded to fit in the groove in the bracket, and the rods 12 are pivoted at its end, the rounded surface being cut away sufficiently to allow the ends of said rods to be headed below said lever. Said rods extend outwardly for engaging and retaining the shaft 13 in their sockets 14 in the usual manner and are adapted to be withdrawn to detach said shafts and the horse by turning the double-armed lever by means of its handle 15, extending within easy reach of the driver. A guide-piece 16 may be secured to the dashboard or the floor of the vehicle for the standard.

To prevent the accidental turning of the lever, a coiled spring 17 is placed around the end of the standard above a nut 18, said spring abutting against the under side of the bracket and holding the lever in the groove in said bracket. The sides of the groove are sloped from the center of the bracket toward its ends, so that the lever can readily be turned, raising it from said groove and withdrawing the rods to allow the shafts to drop, if occasion requires, while at the same time there is no danger of said lever being inadvertently turned.

My invention is much simpler, durable, and more inexpensive than those now in use. Only one spring, and that protected from the weather, is used to effectually secure the rods against premature withdrawal.

I am aware that detail changes may be made in my invention without departing from the spirit or sacrificing the advantages thereof. I therefore reserve the right to make such changes as fairly fall within the scope of my invention.

Having thus described my invention, what I claim as new, and desire to secure by Letters Patent, is—

1. In a device of the character described, a bracket having a groove, a lever having a surface to fit said groove, rods adapted to hold the shafts in their sockets, secured to the ends of said lever, means for holding said lever in said groove against its accidental movement, means for operating said lever.

2. In a device of the character described, a bracket having a groove, a lever having a surface to fit said groove, rods adapted to hold the shafts in their sockets, secured to the rods of said lever, means for holding said lever in said groove against accidental movement, and means for operating said lever comprising a standard extending within reach of the driver, having a square surface engaging a corresponding opening in said lever.

3. In a device of the character described, a bracket having a groove, a lever having a surface to fit said groove, rods adapted to hold the shafts in their sockets, secured to the ends of said lever, and a standard extending within reach of the driver and passing through perforations in said bracket, and said standard having a spring thereon suitably held in place and abutting against said bracket whereby said lever is held against accidental movement in the groove in said bracket.

4. In a device of the character described, a bracket having a groove, a lever having a surface to fit said groove, rods adapted to hold the shafts in their sockets secured to the ends of said lever, the sides of said groove sloping from the center of the bracket toward its ends whereby said lever can be readily drawn from its seat in said groove to withdraw said rods, means for holding said lever in said groove against accidental movement, and means for operating said lever.

5. In a device of the character described, a bracket in one piece having its ends parallel to each other and provided with loops for engagement with the vehicle, the central portion of said bracket resting upon the plane of its ends and provided with a groove, a lever having a surface to fit said groove, rods adapted to hold the shafts in their sockets secured to the ends of said lever, and means for holding said lever in said groove against accidental movement, and means for operating said lever.

In testimony whereof I affix my signature in presence of two witnesses.

WILLIAM THOMAS DUNBAR.

Witnesses:
  J. C. HOBBS,
  E. F. DUNBAR.